Patented May 16, 1933

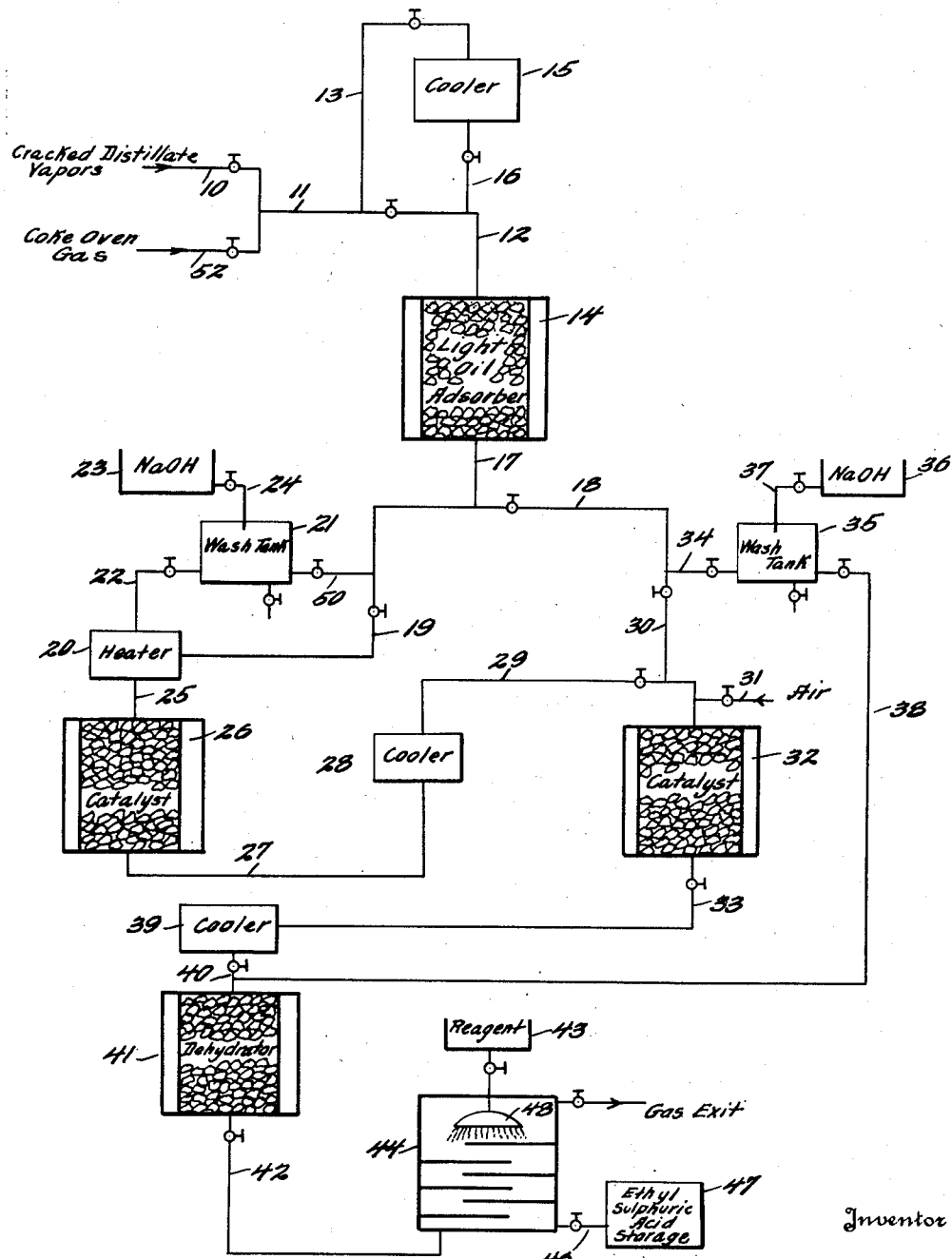

1,909,811

UNITED STATES PATENT OFFICE

GERALD C. CONNOLLY, OF BALTIMORE, MARYLAND, ASSIGNOR TO THE SILICA GEL CORPORATION, OF BALTIMORE, MARYLAND, A CORPORATION OF MARYLAND

METHOD OF REFINING HYDROCARBONS

Application filed May 19, 1930. Serial No. 453,756.

The present invention relates to processes for the recovery of olefinic hydrocarbons from gas and/or vapor mixtures containing them, for example, coke oven gas, distillate vapors emitted from a cracking unit, etc.

Coke oven gases from which the ammonia, tar, and naphthalene have been removed, contain light oils such as benzol, sulphur components such as hydrogen sulphide, carbon disulphide, moisture, and unsaturated hydrocarbons of the olefine series such as ethylene, propylene etc. The vapors of cracked distillate in addition to the unsaturated olefinic hydrocabrons also contain light oils, such as gasolene, sulphur components such as elemental sulphur, hydrogen sulphide and other sulphur compounds, and moisture. The presence of the light oils, sulphur components, and moisture interfere with the extraction of the unsaturated olefine hydrocarbons. Unless these impurities are removed from these gaseous mixtures, the olefine hydrocarbons can not be effectively recovered.

The primary object of the present invention is to provide a practical process for recovering unsaturated olefinic hydrocarbons from gaseous and/or vapor mixtures containing the same.

Another object is to remove the light oils, sulphur components, and moisture prior to the recovery of the olefine hydrocarbons.

Another object is to recover several salable products, such as light oil suitable for the manufacture of motor benzal, benzol, toluol, etc., sulphur for agricultural uses or for the manufacture of sulphuric acid and the alcohol or alcohols for various uses.

Another object is the production of a much desired dry gas that can be sold to city gas companies etc.

Other objects and features of novelty will be apparent from the description taken in connection with the drawing, wherein the single figure is a diagrammatic illustration of an apparatus for carrying out the processes according to this invention.

Briefly stated, the process may comprise contacting the gas and/or vapor mixture with an adsorbent material to remove the light oils, treating the mixture either chemically or catalytically to remove the sulphur components, treating the mixture with a solid adsorbent material to remove the moisture, and contacting the mixture with a substance capable of extracting olefinic hydrocarbons.

The invention will be described in connection with the treatment of gas mixtures from two sources, first cracked distillate vapors and second coke oven gas.

Referring to the drawing, the cracked distillate vapors containing hydrogen gas in addition to the light oil, sulphur components, moisture, and olefine hydrocarbons emitted from a cracking unit flow through pipe 10 into the pipe 11, and thence through pipe 12 into chamber 14 containing a porous adsorbent material such as a gel consisting of either the oxides of silicon, tungsten, aluminum, titanium, or tin or a material such as activated carbon. It is preferred, however, to use silica gel as the adsorbent material. During the passage of the vapors through the chamber 14, the light oil such as gasolene are adsorbed in the gel, and some of the moisture is also removed.

If desired, the vapors may be cooled prior to being introduced into the chamber 14, by passing them through the pipe 13, into a cooler 15 from which they flow through the pipe 16 into the chamber 14.

The light oil adsorbed in the adsorbent material is recovered in any well known manner, and in this form or after suitable refining constitutes a salable product.

The vapors are discharged from the chamber 14 through the pipe 17 into the pipe line 18, and are conveyed through pipe 19 into a heater 20 wherein they are heated to an elevated temperature, for example 350° C. and higher. From the heater, they are discharged through the pipe 25 into a chamber 26 containing a catalyst. In the chamber 26, the vapors are subjected to an elevated temperature in the presence of the catalyst to convert the sulphur components dissolved in the vapors into hydrogen sulphide gas.

The catalyst in the chamber 26 consists of a solid porous material having a catalytic substance associated therewith. The porous material may be a solid porous gel such as a gel of silica, tungsten oxide, titanium oxide, stannic oxide, or aluminum oxide. The catalytic substance may be the oxides of iron, copper, manganese, nickel, etc., or mixtures of the same. The amount of metal oxide associated with the gel may be 1.3% to 4.87%, but preferably 2.5% by weight of the gel. Preferably, the catalyst consists of silica gel impregnated with either ferric oxide, or ferric and nickel oxides, the ferric oxide being present in an amount not exceeding 2.5% by weight of the gel, or if a mixture of NiO and $Fe_2O_3$ is used, about 1.25% of each. While it is preferred to use silica gel impregnated with ferric oxide in the amount stated, as the catalyst, it is to be understood that the catalyst may consist of other solid porous materials impregnated with greater or lesser amounts of suitable oxides of metals.

The catalytic mass in chamber 26 is maintained at an elevated temperature, for example 300° to 450° C. The cracked distillate vapors in passing through the chamber are brought into intimate contact with the catalyst contained therein. This treatment causes the hydrogen associated with the vapors to react with the sulphur components such as elemental sulphur, carbon disulphide, and other sulphur compounds present therein, to convert them into hydrogen sulphide gas.

Ofttimes, the vapors obtained from a cracking unit also contain some hydrogen sulphide gas. This gas, if present in appreciable amounts, is deleterious in that it prevents the complete conversion of the sulphur components dissolved in the vapors when contacted with the catalyst in chamber 26. In this case it is desirable that the hydrogen sulphide gas be removed from the cracked distillate vapors before being introduced into the chamber 26. This may be done by discharging the vapors from the pipe line 18 into the wash tank 21 through the pipe 50. The wash tank 21 is supplied with a solution of an alkali such as sodium hydroxide from a tank 23 containing the sodium hydroxide through the pipe 24. In the wash tank the vapors are thoroughly washed with the alkali solution, the washing effecting the removal of the hydrogen sulphide gas. The scrubbed vapors are conveyed from the wash tank 21 through the pipe 22 into the heater 20 and then to the chamber 26 as previously described.

The treated vapors are discharged from the chamber 26 into a cooler 28 through the pipe 27. In the cooler 28 the vapors are cooled to a temperature of about 225° C. From the cooler 28 the vapors are conveyed by the pipe 29 into the chamber 32 containing a catalyst. The catalyst in this chamber is preferably of the same composition as that used in chamber 26, namely silica gel impregnated with 2.5% of $Fe_2O_3$ by weight of the gel.

An oxidizing medium such as air heated to a temperature of about 200° C. supplied through pipe 31 is admixed with the vapors before they enter the chamber 35, in an amount sufficient to cause the oxidation of the hydrogen sulphide gas.

The catalyst in chamber 32 is maintained at a temperature between about 185° to 225° C. If it is desired to convert the hydrogen sulphide gas into sulphur the temperature of the chamber is maintained below 200° C., preferably 190° C. Should it be desired to convert the hydrogen sulphide gas into sulphur dioxide gas, the temperature of the chamber is maintained above 200° C., say 225° C. or higher.

The treatment of the vapors in chamber 32 causes the hydrogen sulphide gas to be converted into sulphur or sulphur dioxide depending upon the temperature of the chamber. If the catalyst is at a temperature below 200° C. the hydrogen sulphide gas will be converted into sulphur whereas if the temperature is above 200° C. it will be converted into sulphur dioxide.

Where sulphur is produced, it is recovered in any well known manner, and in this form may be used for agricultural purposes. If sulphur dioxide is formed, it may be recovered in any well known manner, and used in the production of sulphuric acid.

In place of removing the hydrogen sulphide gas from the cracked distillate vapors by passing the vapors admixed with an oxidizing medium into chamber 32, and while in said chamber subjecting the vapors to a temperature of about 185° to 210° C. in the presence of a catalyst, the hydrogen sulphide gas may be removed by washing same with an alkali solution. For this treatment the vapors in the line 29 are conveyed through the pipes 30 and 34 into a wash tank 35 which is supplied with an alkali solution such as sodium hydroxide or sodium carbonate from a tank 36 by means of a pipe 37. The treatment of the distillate vapors with the alkali solution in the wash tank 35 removes the hydrogen sulphide gas. The distillate is discharged from the wash tank 35 through the pipe 38 into the pipe 40, and is conveyed through the pipe 40 into the chamber 41 containing a solid adsorbent material.

In cases where the vapors contain only a small percentage of sulphur compounds dissolved therein, the sulphur components may be removed therefrom by either contacting the vapors after being freed of light oil with a catalyst in the presence of an oxidizing medium or treating the same with an alkali solution. For treatment comprising contacting the vapors with a catalyst in the presence of an oxidizing medium, the vapors from the pipe line 18 are discharged through the pipes 30 and 29 into the chamber 32. An oxidizing medium such as air is admixed with the vapors before they enter the chamber 32 by admitting air from the pipe 31 into the pipe 29 in the required amount. The vapors in the chamber 32 are treated in the same manner as previously described.

For the removal of the sulphur components from the vapors with alkali, the vapors from the pipe line 18 are discharged directly into the wash tank 35 through the pipe 34. The wash tank 35 is supplied with a solution of an alkali such as sodium hydroxide from a tank 36 through the pipe 37. After the distillate has been thoroughly washed, it is discharged from the wash tank 35 into the pipe 38 and is conveyed by said pipe 38 into pipe 40 from which it is discharged into chamber 41.

It is extremely important that all of the moisture be removed from the distillate before it is contacted with the substance capable of extracting the olefines, the subsequent step of the process, as it dilutes the substance, and thus prevents the complete recovery of the olefines. This may be done by treating the distillate with a dehydrating agent such as a gel of either the oxides of silicon, titanium, aluminum, or tungsten as by passing the distillate through a chamber 41 containing one of said dehydrating agents.

The distillate freed of moisture is discharged into a chamber 44 through the pipe 42, the chamber being supplied from tank 43 with a substance capable of extracting the olefine hydrocarbons contained in the distillate. The substance is sprayed into the chamber through a spray head 48. The substance capable of extracting the olefine hydrocarbons may be sulphuric acid, or ortho, meta, or pyro-phosphoric acid. Preferably, concentrated sulphuric acid of about 66° Bé is used. The distillate on its passage through the chamber 44, is brought into intimate contact with the sulphuric acid, the sulphuric acid reacting with the ethylene to form ethyl sulphuric acid. The ethyl sulphuric acid is discharged from the chamber 44 through the pipe 46 into the storage receptacle 47.

The ethyl sulphuric acid may be treated in any well known manner to convert it into ethyl alcohol, ether, or ethylene.

The coke oven gases freed of ammonia, tar and naphthalene, may be treated in the same manner as above described. This may be done by causing the coke oven gas from a suitable source of supply to flow through the pipe 52 into the pipe line 11.

Although it is preferred to remove the light oils and sulphur components from the gas or vapor by the methods as described herein it is to be understood that they may be removed by other methods. The olefines can only be efficiently recovered from the gas or vapor mixture containing them if the gas or vapor is thoroughly dehydrated and is substantially free of light oils and sulphur components.

The pipes and tanks are provided with suitable valves and drains, as shown in the drawing.

Having thus described the invention, what is claimed as new and desired to be secured by Letters Patent is:

1. The process of recovering olefine hydrocarbons from a gas or vapor mixture containing light oil, sulphur components, moisture and olefine hydrocarbons consisting in treating the mixture with a solid adsorbent material to remove the light oil, contacting the mixture at a super room temperature in the presence of an oxidizing medium with a catalyst capable of aiding the removal of the sulphur compounds of the mixture, treating the mixture with a solid porous adsorbent material to remove the moisture, and contacting the mixture with a substance capable of extracting the olefine hydrocarbons.

2. The process according to claim 1 wherein the moisture removing adsorbent material is silica gel.

3. The process according to claim 1 wherein the catalyst is a gel impregnated with a metal oxide.

4. The process according to claim 1 wherein the catalyst is a silica gel impregnated with ferric oxide.

5. The process according to claim 1 wherein the substance capable of extracting the olefine hydrocarbons is sulphuric acid.

6. The process of recovering olefine hydrocarbons from a gas or vapor mixture containing light oil, sulphur components, moisture, and olefine hydrocarbons consisting in treating the mixture with a solid adsorbent material to remove the light oil, contacting the mixture at a super room temperature with a catalyst capable of aiding the conversion of the sulphur compounds into hydrogen sulphide gas, contacting the mixture at a lower temperature in the presence of an oxidizing medium with a catalyst capable of aiding the conversion of the hydrogen sulphide into sulphur and sulphur dioxide, treating the mixture with a solid adsorbent material to remove the moisture and contacting the mixture with a substance capable of extracting the olefine hydrocarbons.

7. The process according to claim 6 wherein the solid adsorbent material for removing the light oil, and that for removing the moisture is silica gel.

8. The process according to claim 6 wherein the catalyst is a gel impregnated with a metal oxide.

9. The process according to claim 6 wherein the catalyst is silica gel impregnated with ferric oxide.

10. The process according to claim 6 wherein the substance capable of reacting with the ethylene is sulphuric acid.

11. The process of recovering ethylene from a gas or vapor mixture containing light oil, sulphur components, moisture, and olefine hydrocarbons consisting in treating the mixture with a solid porous adsorbent to remove the light oil, contacting the mixture at a temperature of 300° to 450° C. with a catalyst capable of aiding the conversion of the sulphur components into hydrogen sulphide gas, contacting the mixture at a temperature of 185° to 225° C. in the presence of an oxidizing medium with a catalyst capable of aiding the conversion of the hydrogen sulphide into sulphur and sulphur dioxide, treating the mixture with a solid porous adsorbent to remove the moisture, and contacting the mixture with a substance capable of reacting with the ethylene to form an additive compound.

12. The process according to claim 11 wherein the adsorbent for removing the light oil, and that for removing the moisture is silica gel.

13. The process according to claim 11 wherein the catalyst is silica gel impregnated with ferric oxide.

14. The process according to claim 11 wherein the substance capable of reacting with the ethylene is sulphuric acid.

15. The process of recovering olefine hydrocarbons from a gas or other vapor mixture containing light oil, sulphur components, moisture, and olefine hydrocarbons consisting in removing the light oil, extracting the sulphur components by means of an oxidizing medium in the presence of a catalyst capable of aiding the removal of said components, treating the mixture with a solid porous adsorbent material to remove the moisture including that formed in the preceding steps, and contacting the mixture with a substance capable of extracting the olefine hydrocarbons.

16. The process of recovering olefine hydrocarbons from a gas or vapor mixture containing light oil, sulphur components, moisture, and olefine hydrocarbons consisting in removing the light oil, removing the hydrogen sulphide components, contacting the mixture at super room temperature with a catalyst capable of aiding in the conversion of the remaining sulphur components into hydrogen sulphide gas, removing the hydrogen sulphide formed, treating the mixture with a solid porous adsorbent material to remove the moisture, and contacting the mixture with a substance capable of extracting the olefine hydrocarbons.

In testimony whereof I hereunto affix my signature.

GERALD C. CONNOLLY.